(12) United States Patent
Abe

(10) Patent No.: US 10,971,887 B2
(45) Date of Patent: Apr. 6, 2021

(54) LASER DEVICE AND LASER DEVICE CONTROL METHOD

(71) Applicant: Gigaphoton Inc., Tochigi (JP)

(72) Inventor: Tooru Abe, Oyama (JP)

(73) Assignee: Gigaphoton Inc., Tochigi (JP)

( * ) Notice: Subject to any disclaimer, the term of this patent is extended or adjusted under 35 U.S.C. 154(b) by 264 days.

(21) Appl. No.: 16/101,061

(22) Filed: Aug. 10, 2018

(65) Prior Publication Data

US 2018/0351318 A1 Dec. 6, 2018

Related U.S. Application Data

(63) Continuation of application No. PCT/JP2016/058871, filed on Mar. 18, 2016.

(51) Int. Cl.
*H01S 3/13* (2006.01)
*H01S 3/101* (2006.01)
(Continued)

(52) U.S. Cl.
CPC ............ *H01S 3/101* (2013.01); *G02B 27/108* (2013.01); *G02B 27/1013* (2013.01);
(Continued)

(58) Field of Classification Search
CPC ...... H01S 3/101; H01S 3/0071; H01S 3/2232; H01S 3/2316; H01S 3/235; G02B 27/1013; G02B 27/108; H05G 2/008
See application file for complete search history.

(56) References Cited

U.S. PATENT DOCUMENTS

| 6,084,897 A | 7/2000 | Wakabayashi et al. |
| 6,418,155 B1 | 7/2002 | Wakabayashi et al. |

(Continued)

FOREIGN PATENT DOCUMENTS

| JP | H09-122949 A | 5/1997 |
| JP | H09-248682 A | 9/1997 |

(Continued)

OTHER PUBLICATIONS

International Search Report issued in International Application No. PCT/JP2016/058871; dated Jun. 21, 2016.
(Continued)

*Primary Examiner* — David P Porta
*Assistant Examiner* — Mamadou Faye
(74) *Attorney, Agent, or Firm* — Studebaker & Brackett PC

(57) ABSTRACT

A laser device may include a light source configured to emit a laser beam in burst operation, an optical sensor configured to acquire a cross sectional image of the laser beam during a certain period for every certain cycle, an image processor configured to receive an input of an image signal of the cross sectional image outputted from the optical sensor and output beam relating information about the laser beam, a beam traveling direction adjuster configured to adjust a traveling direction of the laser beam, and a controller configured to control the beam traveling direction adjuster based on the beam relating information when at least a part of a period in which the optical sensor acquires the cross sectional image is overlapped with a period in which the light source emits a laser beam.

7 Claims, 10 Drawing Sheets

(51) Int. Cl.
*H01S 3/00* (2006.01)
*G02B 27/10* (2006.01)
*H05G 2/00* (2006.01)
*H01S 3/23* (2006.01)
*H01S 3/223* (2006.01)

(52) U.S. Cl.
CPC ............ *H01S 3/0071* (2013.01); *H05G 2/008* (2013.01); *H01S 3/2232* (2013.01); *H01S 3/235* (2013.01); *H01S 3/2316* (2013.01)

(56) References Cited

U.S. PATENT DOCUMENTS

| | | | |
|---|---|---|---|
| 2005/0265417 A1* | 12/2005 | Fallon | H01S 3/225 372/55 |
| 2008/0220382 A1* | 9/2008 | Veselinovic | G03F 7/70066 430/346 |
| 2011/0141865 A1 | 6/2011 | Senekerimyan et al. | |
| 2012/0243565 A1 | 9/2012 | Onose et al. | |
| 2012/0307851 A1* | 12/2012 | Hori | H01S 3/2391 372/27 |
| 2013/0148674 A1* | 6/2013 | Nowak | B82Y 20/00 372/26 |
| 2014/0348188 A1* | 11/2014 | Suganuma | H01S 3/10023 372/20 |
| 2015/0168848 A1 | 6/2015 | Tanaka et al. | |
| 2015/0334813 A1* | 11/2015 | Van Schoot | G03F 7/702 355/67 |
| 2016/0285222 A1 | 9/2016 | Suganuma et al. | |
| 2016/0316551 A1 | 10/2016 | Kurosawa | |

FOREIGN PATENT DOCUMENTS

| | | |
|---|---|---|
| JP | H10-144985 A | 5/1998 |
| JP | 2001-320118 A | 11/2001 |
| JP | 2008-098282 A | 4/2008 |
| JP | 2012-199425 A | 10/2012 |
| JP | 2013-513929 A | 4/2013 |
| JP | 2013-201388 A | 10/2013 |
| WO | 2014/030645 A1 | 2/2014 |
| WO | 2015/111219 A1 | 7/2015 |
| WO | 2015/118687 A1 | 8/2015 |

OTHER PUBLICATIONS

Written Opinion issued in International Application No. PCT/JP2016/058871; dated Jun. 21, 2016.
An Office Action mailed by the Japanese Patent Office dated Jan. 28, 2020, which corresponds to Japanese Patent Application No. 2018-505216 and is related to U.S. Appl. No. 16/101,061.
An Office Action mailed by the Japanese Patent Office dated Jun. 2, 2020, which corresponds to Japanese Patent Application No. 2018-505216 and is related to U.S. Appl. No. 16/101,061.

* cited by examiner

| BURST CHANGE TIME INSTANT | BURST STATE |
|---|---|
| 01:12:34.530 | BURST ON |

| index | BURST-ON TIME | BURST-OFF TIME |
|---|---|---|
| 0 | 01:12:34.010 | 01:12:34.110 |
| 1 | 01:12:34.210 | 01:12:34.310 |
| 2 | 01:12:34.400 | 01:12:34.450 |

# LASER DEVICE AND LASER DEVICE CONTROL METHOD

CROSS-REFERENCE TO RELATED APPLICATIONS

The present application is a continuation application of International Application No. PCT/JP2016/058871 filed on Mar. 18, 2016. The content of the application is incorporated herein by reference in its entirety.

BACKGROUND

1. Technical Field

The present disclosure relates to a laser device and a control method for a laser device.

Nowadays, transfer patterns in photolithography in semiconductor processes are finer and finer with semiconductor processes being moved to microfabrication. In the next generation processes, fine patterning with a line width of 20 nm or less is to be requested. Thus, the development of exposure devices that combine a device to generate extreme ultraviolet (EUV) light at a wavelength of about 13 nm with reduced projection reflective optics is expected.

2. Related Art

For EUV light generating apparatuses, three types of devices are proposed: a laser produced plasma (LPP) device that uses plasma generated by applying a laser beam to a target substance; a discharge produced plasma (DPP) device that uses plasma generated by electric discharge; and a synchrotron radiation (SR) device that uses orbital radiation light.

CITATION LIST

Patent Literature

[Patent Literature 1] JP 2012-199425 A
[Patent Literature 2] JP 2001-320118 A
[Patent Literature 3] JP H10-144985 A
[Patent Literature 4] JP H09-248682 A
[Patent Literature 5] JP H09-122949 A
[Patent Literature 6] WO 2014/030645 A

SUMMARY

A laser device according to one aspect of the present disclosure may include a light source, an optical sensor, an image processor, a beam traveling direction adjuster, and a controller. The light source may be configured to emit a laser beam in burst operation. The optical sensor may be configured to acquire a cross sectional image of the laser beam during a certain period for every certain cycle. The image processor may be configured to receive an input of an image signal of the cross sectional image outputted from the optical sensor and output beam relating information about the laser beam. The beam traveling direction adjuster may be configured to adjust a traveling direction of the laser beam. The controller may be configured to control the beam traveling direction adjuster based on the beam relating information when at least a part of a period in which the optical sensor acquires the cross sectional image is overlapped with a period in which the light source emits a laser beam.

There is provided a control method for a laser device according to one aspect of the present disclosure, the laser device including a light source configured to emit a laser beam in burst operation, an optical sensor configured to acquire a cross sectional image of the laser beam during a certain period for every certain cycle, an image processor configured to receive an input of an image signal of the cross sectional image outputted from the optical sensor and output beam relating information about the laser beam, and a beam traveling direction adjuster configured to adjust a traveling direction of the laser beam. Here, the method may include controlling the beam traveling direction adjuster based on the beam relating information when at least a part of a period in which the optical sensor acquires the cross sectional image is overlapped with a period in which the light source emits a laser beam.

BRIEF DESCRIPTION OF THE DRAWINGS

In the following, some embodiments of the present disclosure will be described as simple examples with reference to the accompanying drawings.

DETAILED DESCRIPTION

1. Overview
2. Description of an Extreme Ultraviolet Light Generating System Using a $CO_2$ Laser Device: Comparative Example
   2.1 Configuration
   2.2 Operation
   2.3 Problem
3. First Embodiment
   3.1 Configuration
   3.2 Operation
   3.3 Effect
4. Second Embodiment
   4.1 Configuration
   4.2 Operation
   4.3 Effect
5. Third Embodiment
   5.1 Configuration
   5.2 Operation
   5.3 Effect
6. Fourth Embodiment
   6.1 Configuration
   6.2 Operation
   6.3 Effect In the following, embodiments of the present disclosure will be described in detail with reference to the drawings.

The embodiments to be described below show some examples of the present disclosure, and do not limit the content of the present disclosure. All the configurations and the operations to be described in the embodiments are not necessarily required as the configurations and operations of the present disclosure.

The same components are designated by the same reference signs, and the overlapping description is omitted.

1. Overview

The embodiments of the present disclosure relate to a laser device. The embodiments of the present disclosure relate to a $CO_2$ laser device, for example, used for extreme ultraviolet light generating systems. The $CO_2$ laser device includes a light source to emit a $CO_2$ laser beam that can be entered into the chamber of an extreme ultraviolet light generating apparatus from a correct position. In the following description, extreme ultraviolet light is sometimes referred to as EUV light. Therefore, the extreme ultraviolet light generating apparatus is sometimes referred to as an EUV light generating apparatus. The extreme ultraviolet light generating system is sometimes referred to as an EUV light generating system. In the following description, a $CO_2$ laser device is taken as an example of a laser device for description.

2. Description of an EUV Light Generating System using a $CO_2$ Laser Device: Comparative Example

2.1 Configuration

Figure 1:
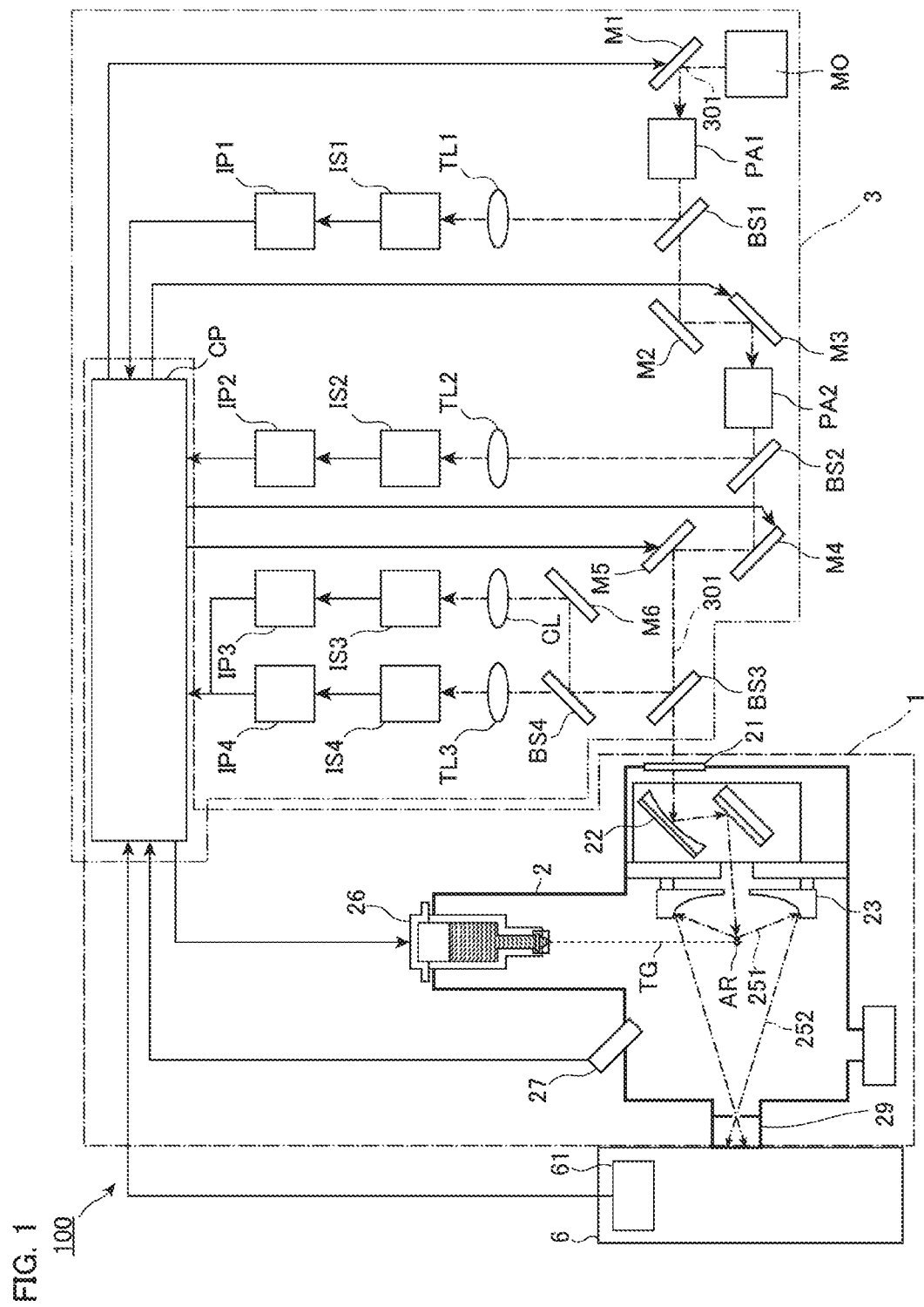
FIG. 1 is a diagram illustrating an exemplary configuration of an EUV light generating system using a $CO_2$ laser device of a comparative example.

FIG. 1 schematically illustrates an exemplary configuration of an EUV light generating system using a $CO_2$ laser device of a comparative example. An EUV light generating system 100 of the comparative example is a system including an EUV light generating apparatus 1 and a $CO_2$ laser device 3. The EUV light generating apparatus 1 of the comparative example is used together with at least one $CO_2$ laser device 3. The EUV light generating system 100 of the comparative example is used together with an exposure device 6.

The exposure device 6 is a device that exposes a semiconductor wafer to EUV light emitted from the EUV light generating system 100. The exposure device 6 includes an exposure controller 61. The exposure controller 61 outputs a burst signal that is on for a predetermined period.

As illustrated in FIG. 1 and as described in detail below, the EUV light generating system 100 includes the EUV light generating apparatus 1 and the $CO_2$ laser device 3.

The EUV light generating apparatus 1 includes a chamber 2 and a target supply unit 26. The chamber 2 is a sealable container. The target supply unit 26 is configured to supply a target substance to the inside of the chamber 2. The target supply unit 26 is mounted to penetrate the wall of the chamber 2, for example. The material of a target substance to be supplied from the target supply unit 26 may include any one of tin, terbium, gadolinium, lithium, and xenon or the combination of two or more of them, which are not limited.

On the wall of the chamber 2, at least one through hole is provided. The through hole is blocked with a window 21. A pulse-like $CO_2$ laser beam 301 emitted from the $CO_2$ laser device 3 is transmitted through the window 21. At the inside of the chamber 2, an EUV light concentrating mirror 23, for example, having a spheroidal reflection plane is placed. The EUV light concentrating mirror 23 has a first focal point and a second focal point. On the surface of the EUV light concentrating mirror 23, a multi-layer reflection film, for example, having molybdenum and silicon alternately stacked is formed. The EUV light concentrating mirror 23 may be placed in such a manner that the first focal point is located in a plasma generation area AR and the second focal point is located at an intermediate focal point (IF). In the center part of the EUV light concentrating mirror 23, a through hole is provided, and the pulse-like $CO_2$ laser beam 301 is transmitted through the through hole.

The EUV light generating apparatus 1 further includes a controller CP, a target sensor 27, and any other components. The target sensor 27 has an imaging function, for example, and is configured to detect the presence, location, trajectory, velocity, and any other parameters of a target TG. The controller CP is formed of a computer having a central processor (CPU) and any other components. The controller CP is configured to control the overall EUV light generating system 100, and also controls the $CO_2$ laser device 3 in addition to the EUV light generating apparatus 1 as described later. That is, the controller CP is shared by the EUV light generating apparatus 1 and the $CO_2$ laser device 3. The controller CP receives inputs of signals of the image data of the target TG imaged at the target sensor 27 and burst signals from the exposure controller 61, for example. The controller CP is configured to process the image data, for example, and configured to control timing to output the target TG and the direction of outputting the target TG, for example. These various control functions are merely examples. Other control functions may be additionally provided, as necessary.

The EUV light generating apparatus 1 includes a connecting part 29 that causes the inside of the chamber 2 to communicate with the inside of the exposure device 6. At the inside of the connecting part 29, a wall formed with an aperture is provided. The wall is preferably placed in such a manner that the aperture is located at the second focal point of the EUV light concentrating mirror 23.

The $CO_2$ laser device 3 includes a master oscillator MO that is a light source configured to operate in burst operation. The master oscillator MO emits the pulse-like $CO_2$ laser beam 301 in a burst-on period. The master oscillator MO is a laser device that emits a laser beam, for example, by pumping a gas having helium, nitrogen, or the like mixed in carbon dioxide by discharge. Alternatively, the master oscillator MO may be a quantum cascade laser device. The master oscillator MO emits the pulse-like $CO_2$ laser beam 301 by Q switched mode, for example. The master oscillator MO may have an optical switch, a polarizer, and any other components. The burst operation means the operation in which the continuous pulse-like $CO_2$ laser beam 301 is emitted at a predetermined repetition frequency in a burst-on period and the emission of the $CO_2$ laser beam 301 is stopped in a burst-off period.

The $CO_2$ laser device 3 further includes a first mirror M1, a first power amplifier PA1, a first beam splitter BS1, a second mirror M2, a third mirror M3, a second power amplifier PA2, a second beam splitter BS2, a fourth mirror M4, a fifth mirror M5, a third beam splitter BS3, a fourth beam splitter BS4, and a sixth mirror M6.

The first to sixth mirrors M1 to M6 are mirrors that reflect the $CO_2$ laser beam 301 at high reflectance. The structures and materials of the first to sixth mirrors M1 to M6 are not limited specifically as long as the mirrors reflect the $CO_2$ laser beam 301. Examples of the materials include flat dielectric multi-layer films and metals. In the comparative example, the first mirror M1, the third mirror M3, the fourth mirror M4, and the fifth mirror M5 are connected to respective actuators, and the positions and angles of their reflection planes are adjustable by the operations of the actuators. Thus, the first mirror M1, the third mirror M3, the fourth mirror M4, and the fifth mirror M5 can adjust the traveling direction of the reflecting $CO_2$ laser beam 301. Therefore, the first mirror M1, the third mirror M3, the fourth mirror M4, and the fifth mirror M5 serve as beam traveling direction adjusters that adjust the traveling direction the $CO_2$ laser beam. On the other hand, the second mirror M2 and the sixth mirror M6 are fixed.

The first and second power amplifiers PA1 and PA2 can amplify the power of the incident $CO_2$ laser beam 301. The configuration of the first power amplifier PA1 is not limited specifically. The first power amplifier PA1 is a regenerative power amplifier, for example.

The first to fourth beam splitters BS1 to BS4 split a part of the power of the $CO_2$ laser beam 301. Each of the first to fourth beam splitters BS1 to BS4 splits a part of the power of the $CO_2$ laser beam 301 by reflecting a part of the incident $CO_2$ laser beam 301 and transmitting the other part, for example. The structures and materials of the first to fourth beam splitters BS1 to BS4 are not limited specifically as long as the beam splitters split a part of the power of the $CO_2$ laser beam 301. Examples of the materials of the beam splitters include flat dielectric multi-layer films and infrared transmission substrates.

The $CO_2$ laser device 3 includes a first transfer lens TL1, a first infrared line sensor IS1, and a first image processor IP1. At least two of the first transfer lens TL1, the first infrared line sensor IS1, and the first image processor IP1 may be modularized. The $CO_2$ laser device 3 further includes a second transfer lens TL2, a second infrared line sensor IS2, and a second image processor IP2. At least two of the second transfer lens TL2, the second infrared line sensor IS2, and the second image processor IP2 may be modularized. The $CO_2$ laser device 3 further includes a condenser lens CL, a third infrared line sensor IS3, and a third image processor IP3. At least two of the condenser lens CL, the third infrared line sensor IS3, and the third image processor IP3 may be modularized. The $CO_2$ laser device 3 includes a third transfer lens TL3, a fourth infrared line sensor IS4, and a fourth image processor IP4. At least two of the third transfer lens TL3, the fourth infrared line sensor IS4, and the fourth image processor IP4 may be modularized.

The first transfer lens TL1 is a lens that transfers the position and cross sectional energy distribution, for example, of the $CO_2$ laser beam 301 entered to the first transfer lens TL1 to the light receiving surface of the first infrared line sensor IS1. Similarly, the second transfer lens TL2 is a lens that transfers the position and cross sectional energy distribution, for example, of the $CO_2$ laser beam 301 entered to the second transfer lens TL2 to the light receiving surface of the second infrared line sensor IS2. Similarly, the third transfer lens TL3 is a lens that transfers the position and cross sectional energy distribution, for example, of the $CO_2$ laser beam 301 entered to the third transfer lens TL3 to the light receiving surface of the fourth infrared line sensor IS4. The condenser lens CL is a lens that concentrates the $CO_2$ laser beam 301 entered to the condenser lens CL on the light receiving surface of the third infrared line sensor IS3.

The first to fourth infrared line sensors IS1 to IS4 are examples of optical sensors, and are line sensors using infrared rays. The infrared line sensors each have a plurality of horizontal lines formed of a plurality of pixels. A screen is configured of the horizontal lines. The infrared line sensors each scan the cross sectional image of the incident $CO_2$ laser beam 301 for every horizontal line to finish a scan for a vertical period, and again start a scan from the first horizontal line. Thus, the infrared line sensors acquire the cross sectional image of the incident $CO_2$ laser beam during a certain period for every certain cycle. The infrared line sensors of the comparative example output signals of light beams received every time when the pixels on the horizontal lines receive the light beam. Thus, the first to fourth infrared line sensors IS1 to IS4 of the comparative example keep outputting image signals for individual pixels during the scan of the light beam.

The first image processor IP1 accumulates image signals for one screen inputted from the first infrared line sensor IS1, calculates beam relating information about the $CO_2$ laser beam 301 entered to the first infrared line sensor IS1, and outputs the information for every screen. As described above, since the first infrared line sensor IS1 acquires the cross sectional image of the incident $CO_2$ laser beam in every certain cycle, the first image processor IP1 outputs the beam relating information in a certain cycle. Similarly, the second image processor IP2 accumulates image signals for one screen inputted from the second infrared line sensor IS2, calculates beam relating information about the $CO_2$ laser beam 301 entered to the second infrared line sensor IS2, and outputs the beam relating information for every screen in a certain cycle. Similarly, the third image processor IP3 accumulates image signals for one screen inputted from the third infrared line sensor IS3, calculates beam relating information about the $CO_2$ laser beam 301 entered to the third infrared line sensor IS3, and outputs the beam relating information for every screen in a certain cycle. Similarly, the fourth image processor IP4 accumulates image signals for one screen inputted from the fourth infrared line sensor IS4, calculates beam relating information about the $CO_2$ laser beam 301 entered to the fourth infrared line sensor IS4, and outputs the beam relating information for every screen in a certain cycle.

As described above, the $CO_2$ laser beam 301 emitted from the transfer lens is entered to the first infrared line sensor IS1, the second infrared line sensor IS2, and the fourth infrared line sensor IS4 of the comparative example. Thus, the beam relating information outputted from the first image processor IP1, the second image processor IP2, and the fourth image processor IP4 of the comparative example can include information about the beam diameter, the position of the beam center of gravity, and the maximum luminance of the $CO_2$ laser beam 301. The $CO_2$ laser beam 301 emitted from the condenser lens CL enters the third infrared line sensor IS3 of the comparative example as described above, with the concentrated $CO_2$ laser beam 301. Thus, the beam relating information outputted from the third image processor IP3 of the comparative example can include information about the beam divergence angle and the beam advancing angle of the $CO_2$ laser beam 301.

Since the controller CP is shared by the EUV light generating apparatus 1 and the $CO_2$ laser device 3 as described above, the $CO_2$ laser device 3 includes the controller CP. The controller CP receives inputs of beam relating information outputted from the first to fourth image processors IP1 to IP4. The controller CP outputs a mirror control signal that controls the first mirror M1 based on the beam relating information inputted from the first image processor IP1. The controller CP outputs a mirror control signal that controls the second mirror M2 based on the beam relating information inputted from the second image processor IP2. The controller CP outputs mirror control signals that control the fourth mirror M4 and the fifth mirror M5 based on the beam relating information inputted from the third and fourth image processors IP3 and IP4. Specifically, the controller CP controls the tilts of the first mirror M1, the third mirror M3, the fourth mirror M4, and the fifth mirror M5 by controlling respective operations of the actuators for these mirrors, not shown. The controller CP outputs a burst signal that operates the master oscillator MO that is a light source in burst operation based on a burst signal inputted from the exposure controller 61.

2.2 Operation

The burst signal outputted from the exposure controller 61 is inputted to the controller CP as described above. The controller CP controls the target supply unit 26 based on the image data of the target TG imaged at the target sensor 27 and the burst signal, for example, and controls the timing of outputting the target TG and the direction of outputting the target TG, for example, as described above. The controller CP outputs a burst signal to the master oscillator MO based on the burst signal inputted from the exposure controller 61. The master oscillator MO performs burst operation based on the burst signal. In the case in which the burst signal is on, the master oscillator MO emits a continuous pulse-like $CO_2$ laser beam 301. The pulse-like $CO_2$ laser beam 301 emitted from the master oscillator MO is reflected off the first mirror M1, and entered to the first power amplifier PA1 for amplification. The pulse-like $CO_2$ laser beam 301 emitted from the first power amplifier PA1 is partially reflected and split at the first beam splitter BS1, and the other part is transmitted through the first beam splitter BS1. The $CO_2$ laser beam 301 transmitted through the first beam splitter BS1 is reflected off the second mirror M2 and the third mirror M3, and entered to the second power amplifier PA2 for amplification. The pulse-like $CO_2$ laser beam 301 emitted from the second power amplifier PA2 is partially reflected and split at the second beam splitter BS2, and the other part is transmitted through the second beam splitter BS2. The $CO_2$ laser beam 301 transmitted through the second beam splitter BS2 is reflected off the fourth mirror M4 and the fifth mirror M5, and partially reflected and split at the third beam splitter BS3, and the other part is transmitted through the third beam splitter BS3. The $CO_2$ laser beam 301 transmitted through the third beam splitter BS3 is entered to the inside of the chamber 2 from the window 21 of the chamber 2.

The pulse-like $CO_2$ laser beam 301 entered to the inside of the chamber 2 travels to the inside of the chamber 2 along at least one laser beam path, is reflected off the laser beam concentrating mirror 22, and travels to the plasma generation area AR that is the target position at the inside of the chamber 2. The target supply unit 26 outputs the target TG toward the plasma generation area AR. Thus, the $CO_2$ laser beam 301 traveling to the plasma generation area AR is applied to at least one target TG. The target TG to which the $CO_2$ laser beam 301 is applied is turned into plasma, and the plasma emits radiation light 251. EUV light 252 included in the radiation light 251 is selectively reflected off the EUV light concentrating mirror 23. The EUV light 252 reflected off the EUV light concentrating mirror 23 is concentrated at the intermediate focal point, and outputted to the exposure device 6. Note that, a plurality of pulse-like $CO_2$ laser beams 301 may be applied to one target TG.

Figure 2:
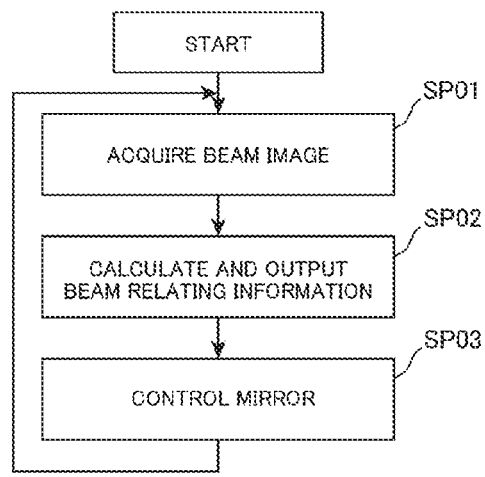
FIG. 2 is a flowchart showing the procedures of adjusting the position and angle of a $CO_2$ laser beam.

In the operation above, the position and angle of the $CO_2$ laser beam 301 entered to the chamber 2 sometimes have to be adjusted. Next, a method for adjusting the position and the angle will be described. FIG. 2 is a flowchart showing the procedures of adjusting the position and angle of the $CO_2$ laser beam 301.

A part of the $CO_2$ laser beam 301 split at the first beam splitter BS1 is entered to the first transfer lens TL1, and transferred to the light receiving surface of the first infrared line sensor IS1. In Step SP01, the first infrared line sensor IS1 scans the cross sectional image of the $CO_2$ laser beam 301 at every horizontal line as described above, and keeps outputting image signals for individual pixels. In Step SP02, after receiving an input of the image signals, the first image processor IP1 calculates and outputs beam relating information for every screen as described above. The beam relating information is inputted to the controller CP. Subsequently, in Step SP03, the controller CP controls the first mirror M1 based on the beam relating information. Since the beam relating information is information about the $CO_2$ laser beam 301 split at the first beam splitter BS1, the beam relating information includes almost the same information as the information about the $CO_2$ laser beam 301 immediately before split at the first beam splitter BS1. Thus, the tilt of the first mirror M1 is adjusted based on the beam relating information, thereby enabling feedback control in such a manner that the position of the center of gravity of the $CO_2$ laser beam 301 transmitted through the first beam splitter BS1 is at a predetermined target position.

A part of the $CO_2$ laser beam 301 split at the second beam splitter BS2 is entered to the second transfer lens TL2, and transferred to the light receiving surface of the second infrared line sensor IS2. In Step SP01, the second infrared line sensor IS2 keeps outputting image signals for individual pixels similarly to the first infrared line sensor IS1. In Step SP02, after receiving an input of the image signals, the second image processor IP2 calculates and outputs beam relating information similarly to the first image processor IP1. The beam relating information is inputted to the controller CP. Subsequently in Step SP03, the controller CP controls the second mirror M2 based on the beam relating information. Since the beam relating information is information about the $CO_2$ laser beam 301 split at the second beam splitter BS2, the beam relating information includes almost the same information about the $CO_2$ laser beam 301 immediately before split at the second beam splitter BS2. Thus, the tilt of the second mirror M2 is adjusted based on the beam relating information, thereby enabling feedback control in such a manner that the position of the center of gravity of the $CO_2$ laser beam 301 transmitted through the second beam splitter BS2 is at a predetermined target position.

A part of the $CO_2$ laser beam 301 split at the third beam splitter BS3 is entered to the fourth beam splitter BS4, and partially reflected and split at the fourth beam splitter BS4, and the other part is transmitted through the fourth beam splitter BS4. The $CO_2$ laser beam 301 split at the fourth beam splitter BS4 is reflected off the sixth mirror M6, and concentrated on the light receiving surface of the third infrared line sensor IS3 through the condenser lens CL. In Step SP01, the third infrared line sensor IS3 keeps outputting image signals for individual pixels similarly to the first infrared line sensor IS1. In Step SP02, after receiving an input of the image signals, the third image processor IP3 calculates and outputs beam relating information. The beam relating information is inputted to the controller CP. The $CO_2$ laser beam 301 transmitted through the fourth beam splitter BS4 is entered to the third transfer lens TL3, and transferred to the light receiving surface of the fourth infrared line sensor IS4. In Step SP01, the fourth infrared line sensor IS4 keeps outputting image signals for individual pixels similarly to the first infrared line sensor IS1. In Step SP02, after receiving an input of the image signals, the fourth image processor IP4 calculates and outputs beam relating information similarly to the first image processor IP1. The beam relating information is inputted to the controller CP. As described above, in the comparative example, the beam relating information outputted from the third image processor IP3 includes information about the beam divergence angle and the beam advancing angle of the $CO_2$ laser beam 301. The beam relating information outputted from the fourth image processor IP4 includes information about the beam diameter, the position of the beam center of gravity, and the maximum luminance of the $CO_2$ laser beam 301. Thus, information combining the beam relating information outputted from the third image processor IP3 and the beam relating information outputted from the fourth image processor IP4 includes information richer than the beam relating information outputted from the first image processor IP1 and the beam relating information outputted from the second image processor IP2. Subsequently in Step SP03, the controller CP controls the fourth mirror M4 and the fifth mirror M5 based on the beam relating information inputted from the third image processor IP3 and the fourth image processor IP4. These two mirrors can each adjust the traveling direction of the $CO_2$ laser beam 301. Controlling these two mirrors enables the translation of the position of the center of gravity of the $CO_2$ laser beam 301 before entered to the third beam splitter BS3. The pieces of the beam relating information outputted from the third and the fourth image processors IP3 and IP4 are based on the information about the $CO_2$ laser beam 301 split at the third beam splitter BS3. Thus, the pieces of the beam relating information outputted from the third and the fourth image processors IP3 and IP4 include almost the same information as the information about the $CO_2$ laser beam 301 immediately before split at the third beam splitter BS3. Therefore, adjusting the tilts of the fourth mirror M4 and the fifth mirror M5 based on the pieces of the beam relating information sets the traveling direction of the $CO_2$ laser beam 301 transmitted through the third beam splitter BS3 to a predetermined direction, thereby enabling feedback control in such a manner that the position of the center of gravity is at a predetermined target position.

Accordingly, the position and angle of the $CO_2$ laser beam 301 entered to the chamber 2 can be adjusted.

2.3 Problem

Figure 3:
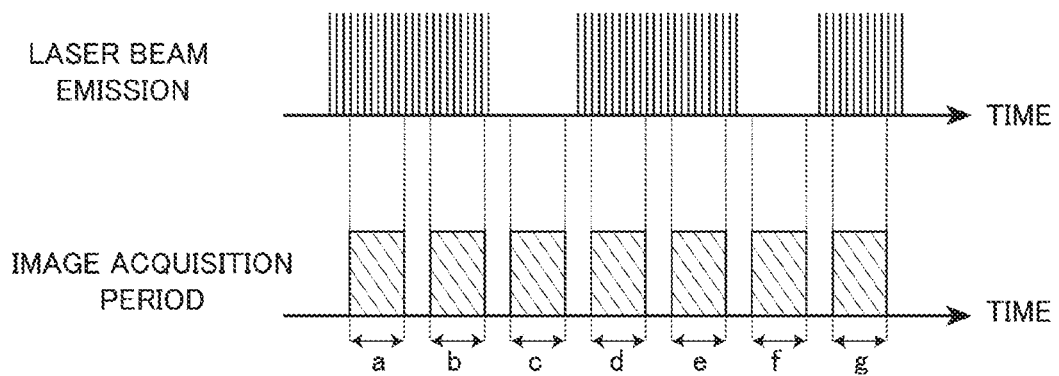
FIG. 3 is a diagram illustrating a period in which a master oscillator emits a $CO_2$ laser beam and a period in which an infrared line sensor acquires an image.

FIG. 3 is a diagram illustrating a period in which the master oscillator MO emits the $CO_2$ laser beam 301 and a period in which the infrared line sensor acquires an image. Note that, in the following description, the infrared line sensor is any one of the first to fourth infrared line sensors IS1 to IS4. The image processor is any one of the first to fourth image processors IP1 to IP4. The mirror is any one of the first mirror M1, the third mirror M3, the fourth mirror M4, and the fifth mirror M5. In FIG. 3, a period indicated by a square shaded area is a period in which the infrared line sensor acquires the cross sectional image of the $CO_2$ laser beam 301.

In an example illustrated in FIG. 3, in period a, period b, period d, period e, and period g, the period in which the burst signal from the controller CP is on and the master oscillator MO is burst-on is overlapped with the period in which the infrared line sensor acquires a cross sectional image. However, in period c and period f, the period in which the master oscillator MO is burst-on is not overlapped with the period in which the infrared line sensor acquires a cross sectional image.

In the case in which the period in which the master oscillator MO is burst-on is not overlapped with the period in which the infrared line sensor acquires an image as in period c and period f, the image signal outputted from the infrared line sensor does not include information about the cross section of the $CO_2$ laser beam 301. Therefore, beam relating information outputted from the image processor does not include information about the $CO_2$ laser beam 301 as well. Thus, in this case, the beam relating information outputted from the image processor is information based on noise. In this case, the controller CP controls the mirror according to the beam relating information based on noise, resulting in the possibility that the feedback control is incorrectly performed on the mirror and the mirror is not adjusted in the direction in which the mirror has to be originally directed. Thus, there may occur a problem in which a $CO_2$ laser beam subsequently emitted from the master oscillator MO is entered to the chamber of the EUV light generating apparatus from an incorrect position. Therefore, in the following embodiments, a $CO_2$ laser device is shown as an example in which a $CO_2$ laser beam emitted from a master oscillator MO can be entered to the chamber of an EUV light generating apparatus from a correct position.

3. First Embodiment

Next, an EUV light generating system using a $CO_2$ laser device according to a first embodiment will be described in detail with reference to the drawings. Note that, in the following description, a beam splitter BS shows any one of a first beam splitter BS1, a second beam splitter BS2, a third beam splitter BS3, and a fourth beam splitter BS4. Configurations similar to the configurations described above are designated by the same reference signs, and the overlapping description is omitted unless otherwise specified.

3.1 Configuration

Figure 4:
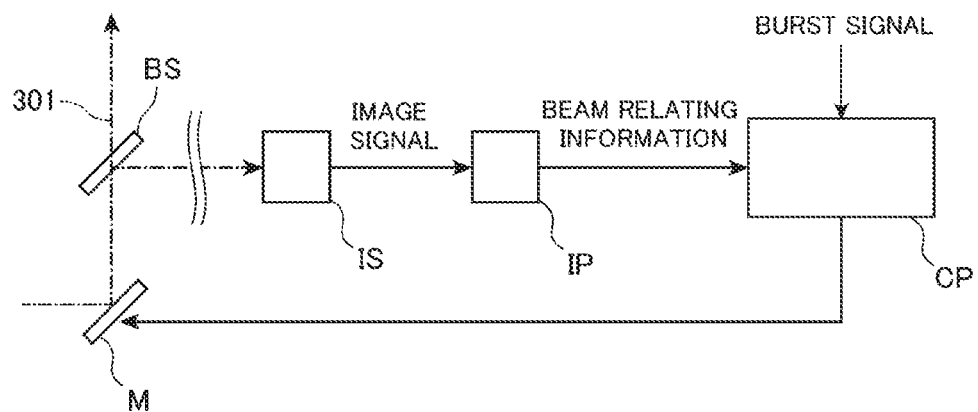
FIG. 4 is a general diagram of main components that adjust the position and angle of a $CO_2$ laser beam in FIG. 1, with the main components adapted to a first embodiment.
Figure 5:
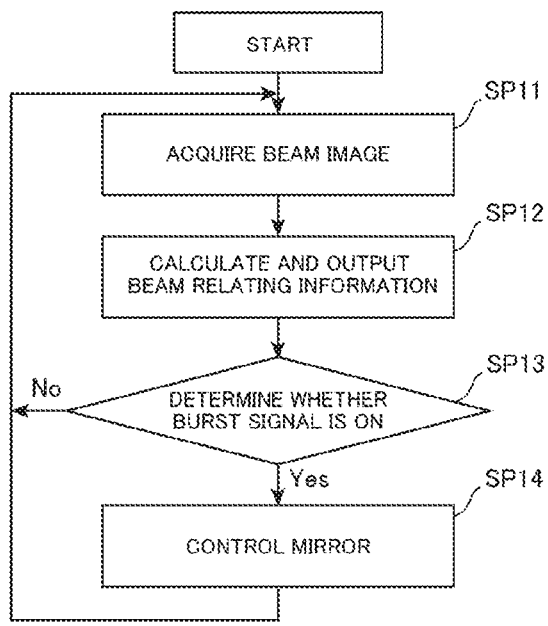
FIG. 5 is a flowchart showing the procedures of adjusting the position and angle of a $CO_2$ laser beam according to the first embodiment.

FIG. 4 is a general diagram of main components that adjust the position and angle of a $CO_2$ laser beam 301 in FIG. 1, with the main components adapted to the embodiment. FIG. 5 is a flowchart showing the procedures of adjusting the position and angle of the $CO_2$ laser beam 301 according to the embodiment. As illustrated in FIG. 4, also in the embodiment, a burst signal is inputted to a controller CP similarly to the comparative example.

3.2 Operation

A part of the $CO_2$ laser beam 301 split at a beam splitter BS illustrated in FIG. 4 is concentrated or transferred to a lens, not shown in FIG. 4, and entered to an infrared line sensor IS. Similarly in Step SP01 of the comparative example, in Step SP11, the infrared line sensor IS scans the cross sectional image of the $CO_2$ laser beam 301 at every horizontal line, and keeps outputting image signals for individual pixels. Similarly in Step SP02 of the comparative example, in Step SP12, after receiving an input of the image signals, the image processor IP outputs beam relating information for every screen, and the beam relating information is inputted to the controller CP. Subsequently in Step SP13, the controller CP determines whether the burst signal to be inputted is on. In the case in which the burst signal is not on, the controller CP does not control a mirror M, and waits for an input of a subsequent beam relating information. On the other hand, in the case in which the burst signal is on, similarly in Step SP03 of the comparative example, in Step SP14, the controller CP controls the mirror M based on the inputted beam relating information. At this time, since the burst signal inputted to a master oscillator MO is on as well, the master oscillator MO is burst-on, and emits the continuous pulse-like $CO_2$ laser beam 301. The tilt of the mirror M is adjusted in this manner, thereby enabling feedback control in such a manner that the position of the center of gravity of the $CO_2$ laser beam 301 transmitted through the beam splitter BS is at a predetermined target position.

3.3 Effect

In the embodiment, the controller CP controls the mirror M based on the beam relating information in the case in which the burst signal is on. Thus, in the embodiment, the controller CP controls the mirror M in a state that at least a part of the period in which the infrared line sensor IS acquires the cross sectional image of the $CO_2$ laser beam is overlapped with the period in which the $CO_2$ laser beam is emitted from the master oscillator MO. In accordance with the $CO_2$ laser device 3 of the embodiment, controlling the mirror according to the beam relating information based on noise can be reduced, and the entrance of the $CO_2$ laser beam emitted from the master oscillator MO to the chamber of the EUV light generating apparatus from an incorrect position can be reduced.

4. Second Embodiment

Next, an EUV light generating system using a $CO_2$ laser device according to a second embodiment will be described in detail with reference to the drawings. Note that, in the following description, configurations similar to the configurations described above are designated by the same reference signs, and the overlapping description is omitted unless otherwise specified.

4.1 Configuration

Figure 6:
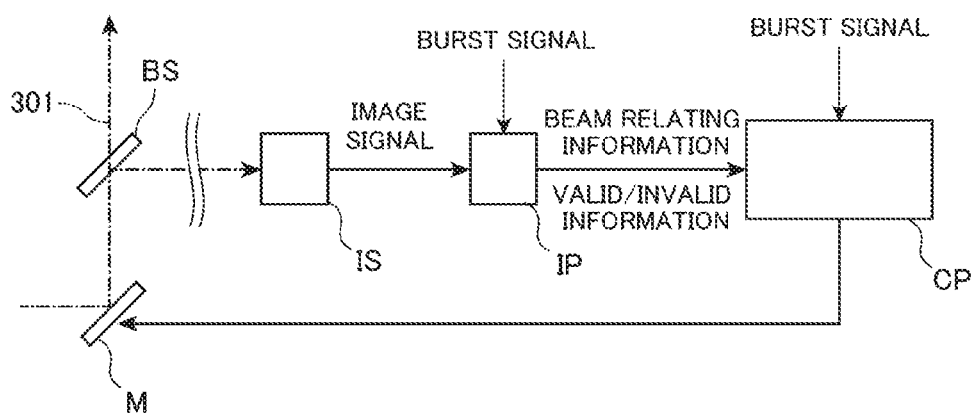
FIG. 6 is a general diagram of main components that adjust the position and angle of a $CO_2$ laser beam in FIG. 1, with the main components adapted to a second embodiment.

FIG. 6 is a general diagram of main components that adjust the position and angle of a $CO_2$ laser beam 301 in FIG. 1, with the main components adapted to the embodiment. As illustrated in FIG. 6, the $CO_2$ laser device according to the embodiment is different from the $CO_2$ laser device 3 of the comparative example in that a burst signal from an exposure controller 61 is inputted to an image processor IP.

4.2 Operation

Figure 7:
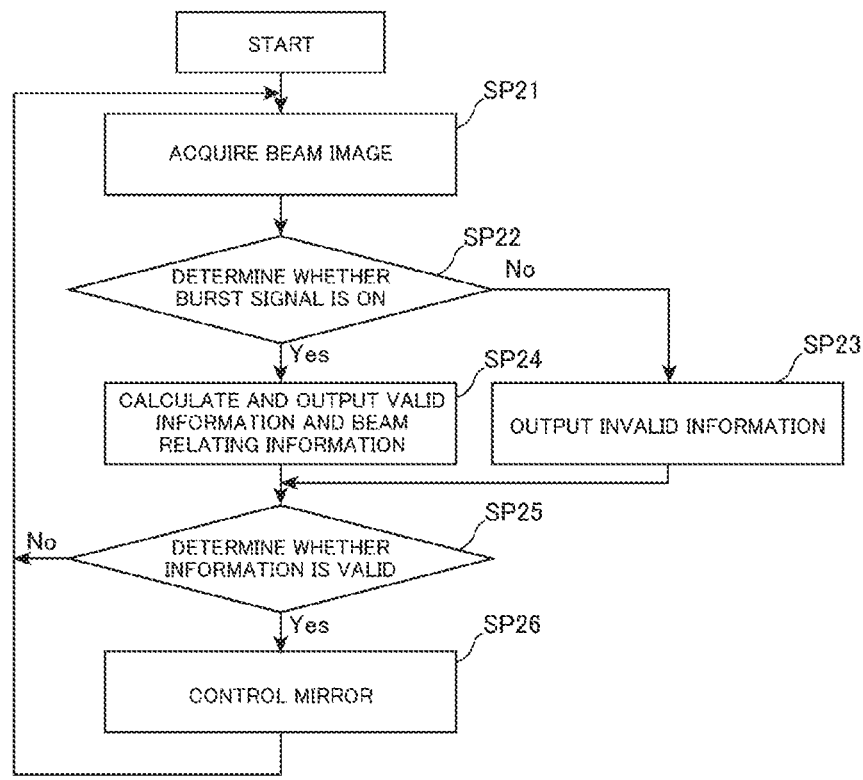
FIG. 7 is a flowchart showing the procedures of adjusting the position and angle of a $CO_2$ laser beam according to the second embodiment.

FIG. 7 is a flowchart showing the procedures of adjusting the position and angle of the $CO_2$ laser beam 301 according to the embodiment. A part of the $CO_2$ laser beam 301 split at a beam splitter BS illustrated in FIG. 6 is concentrated or transferred to a lens, not shown in FIG. 6, and entered to an infrared line sensor IS. Similarly in Step SP01 of the comparative example, in Step SP21, the infrared line sensor IS scans the cross sectional image of the $CO_2$ laser beam 301 at every horizontal line, and keeps outputting image signals for individual pixels. In Step SP22, after receiving an input of the image signals, the image processor IP determines whether the burst signal from the exposure controller 61 is on. In the case in which the burst signal from the exposure controller 61 is off, in Step SP23, the image processor IP outputs invalid information indicating that beam relating information is invalid information to the controller CP. Similarly in Step SP02 of the comparative example, in Step SP24, in the case in which the burst signal is on, the image processor IP outputs beam relating information for every screen, and the beam relating information is inputted to the controller CP. Subsequently in Step SP25, the controller CP determines whether information inputted from the image processor IP is invalid information or valid information. In the case in which invalid information is inputted from the image processor IP, the controller CP determines that the information is invalid, does not control a mirror M, and waits for an input of a subsequent beam relating information. On the other hand, in the case in which no invalid information is inputted from the image processor IP and beam relating information is inputted, the controller CP determines that the beam relating information is valid. Similarly in Step SP03 of the comparative example, in Step SP26, the controller CP controls the mirror M based on the inputted beam relating information. Accordingly, feedback control is correctly performed in such a manner that the position of the center of gravity of the $CO_2$ laser beam 301 transmitted through the beam splitter BS is at a predetermined target position. At this time, the burst signal is also inputted to the controller CP. A master oscillator MO is burst-on based on the burst signal inputted from the controller CP to the master oscillator MO. As described above, the burst signal inputted from the controller CP to the master oscillator MO is based on the burst signal inputted from the exposure controller 61 to the controller CP. Thus, in the embodiment, it can be understood that the burst signal to cause the master oscillator MO to be in burst operation is inputted to the image processor IP.

4.3 Effect

In the embodiment, the burst signal is inputted to the image processor IP. Thus, the embodiment can have the configuration in which the image processor IP performs no image processing when the burst signal is not on. In this case, the load of the image processor IP can be decreased. In the case in which the burst signal inputted to the image processor IP is not on, the image processor IP outputs invalid information to the controller CP. Thus, it is possible to suppress controlling of the mirror M by the controller CP according to beam relating information based on image data acquired by the infrared line sensor IS in the period in which the master oscillator MO is not burst-on. Therefore, in accordance with the $CO_2$ laser device 3 of the embodiment, controlling the mirror according to the beam relating information based on noise can be suppressed, and the entrance of the $CO_2$ laser beam emitted from the master oscillator MO to the chamber of the EUV light generating apparatus from an incorrect position can be reduced.

5. Third Embodiment

Next, an EUV light generating system using a $CO_2$ laser device according to a third embodiment will be described in detail with reference to the drawings. Note that, in the following description, configurations similar to the configurations described above are designated by the same reference signs, and the overlapping description is omitted unless otherwise specified.

5.1 Configuration

Figures 8, 9, 10:
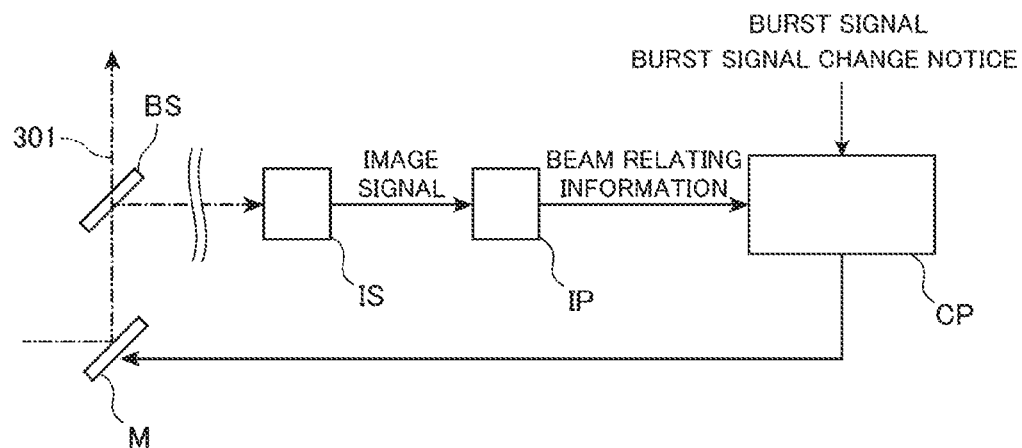
FIG. 8 is a general diagram of main components that adjust the position and angle of a $CO_2$ laser beam in FIG. 1, with the main components adapted to a third embodiment.
FIG. 9 is a diagram of an exemplary table showing a time instant at which a controller receives a burst signal change notice and a burst state.
FIG. 10 is a diagram of an exemplary table of history information showing emission time periods in which a $CO_2$ laser beam has been emitted from a master oscillator in an earlier time.

FIG. 8 is a general diagram of main components that adjust the position and angle of a $CO_2$ laser beam 301 in FIG. 1, with the main components adapted to the embodiment. As illustrated in FIG. 8, a $CO_2$ laser device 3 according to the embodiment is different from the $CO_2$ laser device 3 of the comparative example in that a burst signal change notice is inputted to a controller CP. The burst signal change notice is a notice indicating timing at which a burst signal outputted from an exposure controller 61 is turned on and timing at which the burst signal is turned off.

In the embodiment, the controller CP includes an information memory that records the time instant at which the controller CP receives a burst signal change notice and the burst state of a master oscillator MO based on the burst signal change notice. FIG. 9 is a diagram of an exemplary table showing the time instant at which the controller CP receives a burst signal change notice and the received burst state. As illustrated in FIG. 9, the controller CP records the time instant at which the controller CP receives the burst signal change notice and the received burst state of the master oscillator MO that is on or off.

The controller CP includes a memory that records history information about an emission time period in which the master oscillator MO has been burst-on and a continuous pulse-like $CO_2$ laser beam 301 has been emitted. FIG. 10 is a diagram of an exemplary table of history information showing an emission time period in which a $CO_2$ laser beam has been emitted from the master oscillator MO in an earlier time. As illustrated in FIG. 10, in the embodiment, the time instant at which the master oscillator MO has been burst-on and the time instant at which the master oscillator MO has been burst-off in an earlier time are recorded. A time period from burst-on time to burst-off time is an emission time period in which a $CO_2$ laser beam 301 has been emitted from the master oscillator MO. Note that, in an example illustrated in FIG. 10, indexes are associated with emission time periods in which a $CO_2$ laser beam 301 has been emitted from the master oscillator MO in ascending order by time. The emission time period associated with index 0 is the oldest time period.

5.2 Operation

Figure 11:
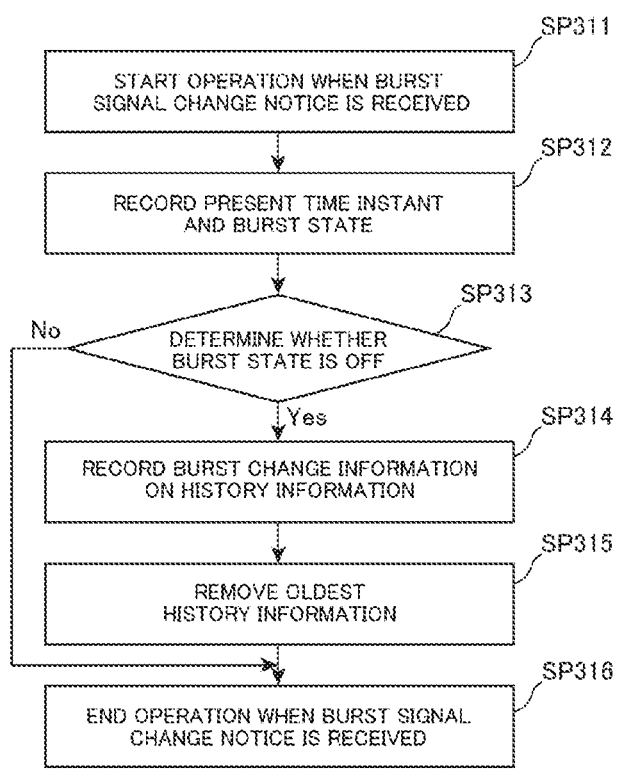
FIG. 11 is a flowchart showing the procedures of recording the burst-on time of the master oscillator and the burst-off time of the master oscillator by the controller based on the burst signal change notice.

First, the procedures when the controller CP receives a burst signal change notice will be described. FIG. 11 is a flowchart showing the procedures of recording the burst-on time of the master oscillator MO and the burst-off time of the master oscillator MO by the controller CP based on the burst signal change notice. In Step SP311, the controller CP receives a burst signal change notice. In Step SP312, the controller CP records, on the table shown in FIG. 9, a time instant at which the burst signal change notice is received and whether the notice is a burst-on notice or a burst-off notice for the master oscillator MO. In the case in which the notice is a burst-on notice, the master oscillator MO emits the $CO_2$ laser beam 301. In the case in which the notice is a burst-off notice, the emission of the $CO_2$ laser beam 301 from the master oscillator MO is stopped.

Subsequently, in Step SP313, the controller CP determines whether the received burst state of the master oscillator MO is off. In the case in which the burst state is off, in Step SP314, the controller CP updates the history information shown in FIG. 10. Specifically, the controller CP records the latest burst-on time and the latest burst-off time on an index having the largest numerical character. In Step SP315, the controller CP removes the row of the oldest index, and decreases the numbers of indexes in the remaining rows by one. Accordingly, the row of an index having the largest numerical character is again empty. On the other hand, in Step SP313, in the case in which the received burst state is not off, the controller CP does not update the history information shown in FIG. 10. Accordingly, the procedures when the burst signal change notice is received are finished.

Figure 12:
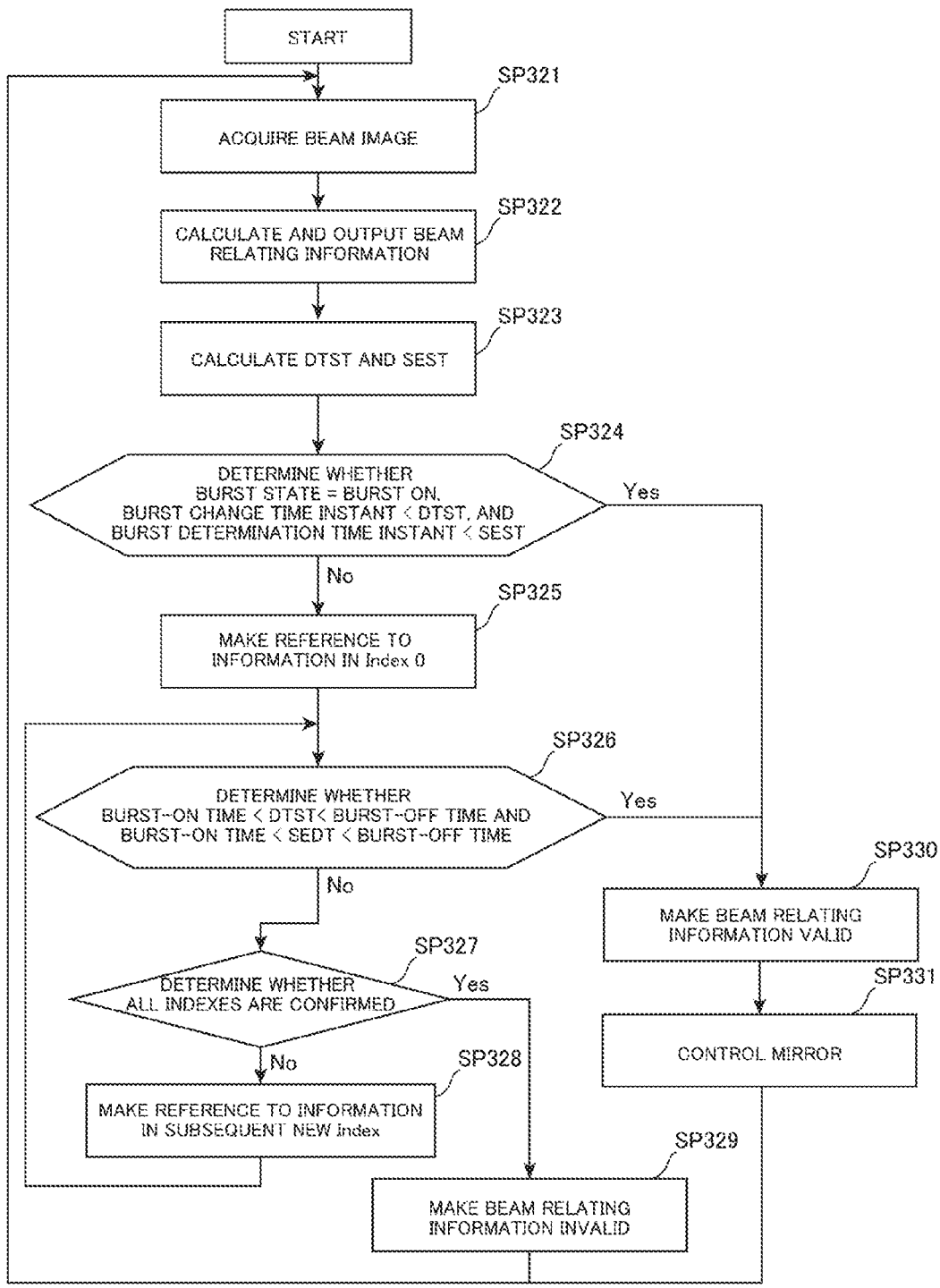
FIG. 12 is a flowchart showing the procedures of adjusting the position and angle of a $CO_2$ laser beam according to the third embodiment.

Next, the procedures of adjusting the position and angle of the $CO_2$ laser beam 301 according to the embodiment will be described. FIG. 12 is a flowchart showing the procedures of adjusting the position and angle of the $CO_2$ laser beam 301 according to the embodiment. A part of the $CO_2$ laser beam 301 split at the beam splitter BS illustrated in FIG. 8 is concentrated or transferred to a lens, not shown in FIG. 8, and entered to an infrared line sensor IS. Similarly in Step SP01 of the comparative example, in Step SP321, the infrared line sensor IS scans the cross sectional image of the $CO_2$ laser beam 301 at every horizontal line, and keeps outputting image signals for individual pixels. Similarly in Step SP02 of the comparative example, in Step SP322, after receiving an input of the image signals, the image processor IP outputs beam relating information for every screen, and the beam relating information is inputted to the controller CP.

Subsequently in Step SP323, the controller CP calculates a time instant that precedes, by a time period required for data processing, the time instant at which beam relating information is received. The data processing time period is a time period required for processing data received by the image processor IP from the infrared line sensor IS. The data processing time period can be expressed using a predetermined parameter. Thus, the time instant that precedes, by a time period required for data processing, the time instant at which beam relating information is received expresses data transfer stop time DTST that is a time instant at which the infrared line sensor IS finishes the transfer of image data to the image processor IP. The data transfer stop time DTST is almost the same as the time instant at which the infrared line sensor IS finishes the scan of the last pixel. The controller CP calculates a time instant that precedes, by a sensor exposure time period, the data transfer stop time DTST. The sensor exposure time period is a time period required for scanning one screen by the infrared line sensor IS. The sensor exposure time period can be expressed using a predetermined parameter. Thus, the time instant that precedes, by the sensor exposure time period, the data transfer stop time DTST expresses sensor exposure start time SEST that is a time instant at which the infrared line sensor IS starts a scan.

Figure 13:
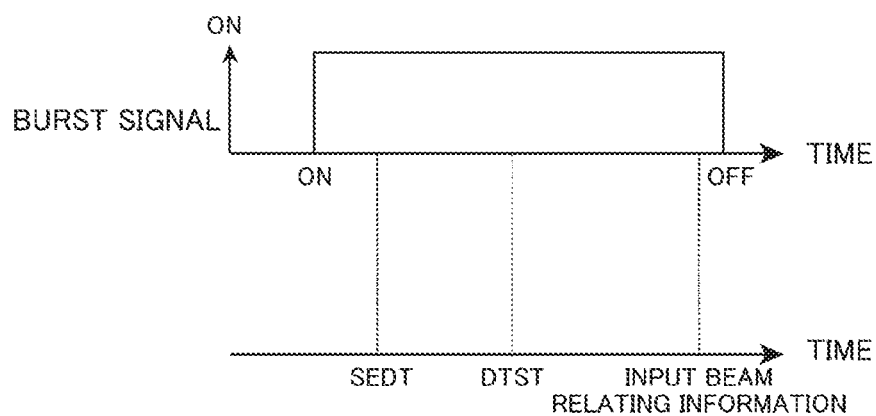
FIG. 13 is a diagram illustrating the state in which the conditions in Step SP324 in FIG. 12 are satisfied.

Subsequently, in Step SP324, the controller CP makes reference to the table shown in FIG. 9, and determines whether to satisfy the conditions in which the present state of the master oscillator MO is burst-on, the time instant at which the burst signal change notice is received precedes the data transfer stop time DTST, and the time instant at which the burst signal change notice is received precedes the sensor exposure start time SEST. In the case in which these conditions are satisfied, the master oscillator MO is burst-on, the beam relating information inputted to the controller CP is based on image data acquired by the infrared line sensor IS in the burst-on state immediately before, and hence the beam relating information is valid. FIG. 13 is a diagram illustrating the state in which the conditions in Step SP324 in FIG. 12 are satisfied. In FIG. 13, a time instant indicated by ON is a time instant at which a burst signal change notice indicating that the burst signal is on is inputted. The burst signal is turned on at this time instant. In FIG. 13, a time instant indicated by OFF is a time instant at which a burst signal change notice indicating that the burst signal is off is inputted. The burst signal is turned off at this time instant. When it is determined that the state of the master oscillator MO is burst-on in Step SP324, the burst signal change notice that is received last is a burst-on notice. In the state shown in FIG. 13, the time instant at which the burst signal change notice is received precedes the data transfer stop time DTST and the sensor exposure start time SEST. Therefore, in this case, the period in which the infrared line sensor IS acquires the cross sectional image of the $CO_2$ laser beam 301 is within the burst-on period. In this case, in Step SP330, the controller CP determines that the received beam relating information is valid. Similarly in Step SP03 of the comparative example, in Step SP331, the controller CP controls a mirror M based on the inputted beam relating information. Accordingly, feedback control is performed in such a manner that the position of the center of gravity of the $CO_2$ laser beam 301 transmitted through the beam splitter BS is at a predetermined target position.

Figure 14:
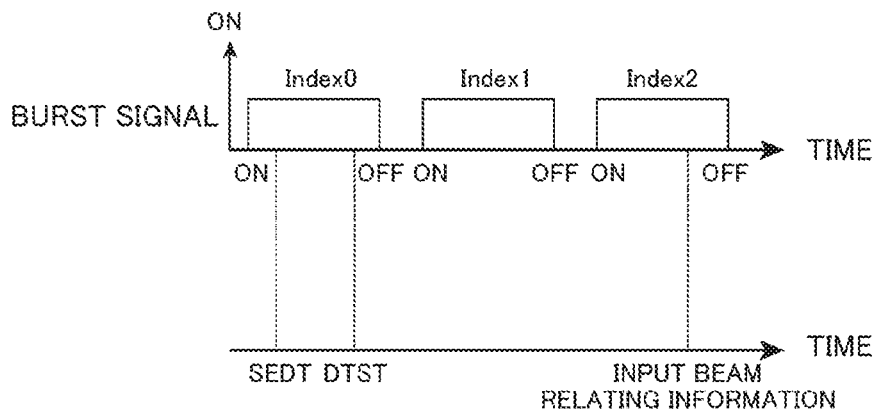
FIG. 14 is a diagram illustrating the state in which data transfer stop time and sensor exposure start time are provided between burst-on time and burst-off time in index 0.

On the other hand, in the case in which the conditions are not satisfied in Step SP324, in Step SP325, the controller CP makes reference to information of index 0, i.e., the oldest information about the emission time period in which the $CO_2$ laser beam 301 has been emitted from the master oscillator MO. In Step SP326, the controller CP compares the burst-on time and the burst-off time in index 0 with the data transfer stop time DTST and the sensor exposure start time SEST. Specifically, the controller CP determines whether the conditions are satisfied in which the data transfer stop time DTST is the time instant between the burst-on time and the burst-off time and the sensor exposure start time SEST is the time instant between the burst-on time and the burst-off time. FIG. 14 is a diagram illustrating the state in which the data transfer stop time DTST and the sensor exposure start time SEST are present between the burst-on time and the burst-off time in index 0. In the state shown in FIG. 14, the entire period in which the infrared line sensor IS acquires the cross sectional image of the CO2 laser beam 301 is within the burst-on period. In the case in which the conditions in Step SP324 are satisfied as described above, in Step SP330, the controller CP determines that the received beam relating information is valid similarly to the processes above. Thus, in Step SP331, the controller CP controls the mirror M based on the inputted beam relating information.

In the case in which the conditions in Step SP326 are not satisfied, in Step SP327, the controller CP determines whether the comparison of the burst-on time and the burst-off time in all the indexes with the data transfer stop time DTST and the sensor exposure start time SEST is finished. In the case in which the comparison is finished in all the indexes, in Step SP329, the controller CP determines that the inputted beam relating information is invalid, does not control the mirror M, and waits for an input of a subsequent beam relating information.

On the other hand, in Step SP327, in the case in which the controller CP determines that the comparison is not finished in all the indexes, in Step SP328, the controller CP makes reference to information in an index that is one index newer than the index presently used for comparison. Specifically, in the case in which the controller CP makes reference to information in index 0, the controller CP makes reference to information in subsequent index 1. The controller CP executes the process in Step SP326 using information in the new index. In the case in which the conditions in Step SP326 are satisfied in any one index, in Step SP330, the controller CP determines that the received beam relating information is valid similarly to the processes above. In Step SP331, the controller CP controls the mirror M based on the inputted beam relating information.

5.3 Effect

In the embodiment, the controller CP includes history information having a plurality of emission time periods in which a $CO_2$ laser beam 301 has been emitted from the master oscillator MO in an earlier time. The controller CP controls the mirror M based on the beam relating information in the case in which the acquisition time period in which the infrared line sensor IS acquires the cross sectional image of the $CO_2$ laser beam 301 is overlapped with any one of emission time periods in the history information. Thus, even in the case in which the processing performance of the image processor IP is poor, it can be appropriately determined whether the beam relating information inputted to the controller CP is based on the information that the infrared line sensor IS has acquired the image in any one of the burst-on periods in an earlier time. Thus, controlling the mirror according to the beam relating information based on noise can be more appropriately suppressed. Therefore, the entrance of the $CO_2$ laser beam emitted from the master oscillator MO to the chamber of the EUV light generating apparatus from an incorrect position can be more appropriately reduced.

Note that, in the embodiment, the burst-on time and the burst-off time are recorded on history information as the burst signal change notice is a starting point. However, since the burst signal is inputted to the controller, the controller may record the burst-on time and the burst-off time, managing the burst signal.

6. Fourth Embodiment

Next, an EUV light generating system using a $CO_2$ laser device according to a fourth embodiment will be described in detail with reference to the drawings. Note that, in the following description, configurations similar to the configurations described above are designated by the same reference signs, and the overlapping description is omitted unless otherwise specified.

6.1 Configuration

Figure 15:
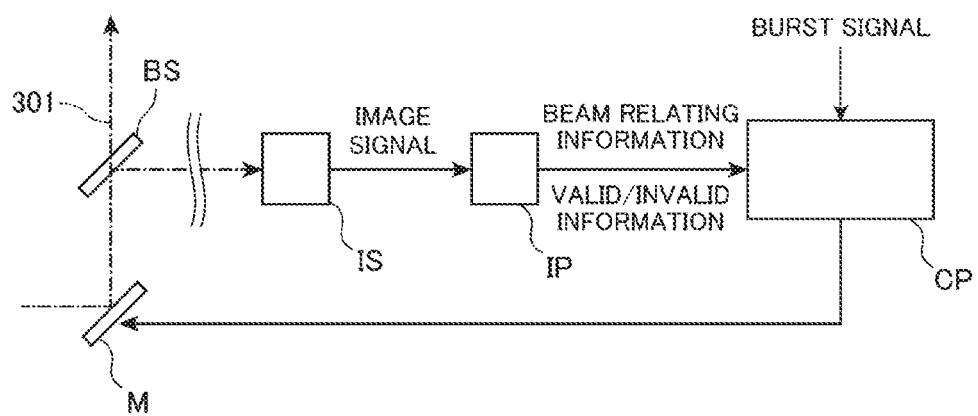
FIG. 15 is a general diagram of main components that adjust the position and angle of a $CO_2$ laser beam in FIG. 1, with the main components adapted to a fourth embodiment.

FIG. 15 is a general diagram of main components that adjust the position and angle of a $CO_2$ laser beam 301 in FIG. 1, with the main components adapted to the embodiment. As illustrated in FIG. 15, a $CO_2$ laser device 3 according to the embodiment is different from the $CO_2$ laser device 3 of the comparative example in that an image processor IP outputs index information about valid data or invalid data together with beam relating information.

6.2 Operation

Figure 16:
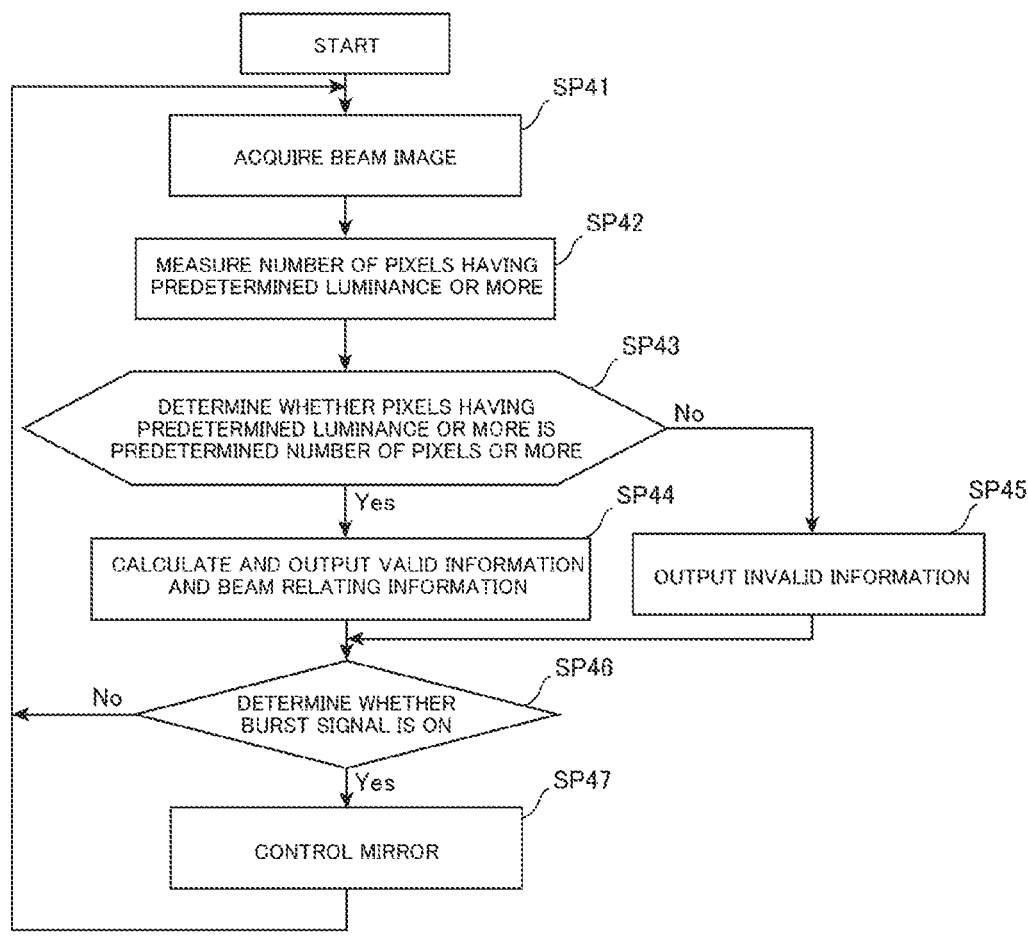
FIG. 16 is a flowchart showing the procedures of adjusting the position and angle of a $CO_2$ laser beam according to the fourth embodiment.

FIG. 16 is a flowchart showing the procedures of adjusting the position and angle of the $CO_2$ laser beam 301 according to the embodiment. A part of the $CO_2$ laser beam 301 split at a beam splitter BS illustrated in FIG. 15 is concentrated or transferred to a lens, not shown in FIG. 15, and entered to an infrared line sensor IS. Similarly in Step SP01 of the comparative example, in Step SP41, the infrared line sensor IS scans the cross sectional image of the $CO_2$ laser beam 301 at every horizontal line, and keeps outputting image signals for individual pixels. In Step SP42, after receiving an input of the image signals, the image processor IP measures the number of pixels having a predetermined luminance or more on all the pixels from which light is received at the infrared line sensor IS. This predetermined luminance is 30% of the dynamic range measurable at the infrared line sensor IS, for example. In Step SP43, the image processor IP determines whether the measured number of pixels is a predetermined number of pixels or more. This predetermined number of pixels is 70% or more of the number of pixels having the predetermined luminance or more in the case in which the infrared line sensor IS scans the cross sectional image of the $CO_2$ laser beam 301 in normal operation, for example. In the case in which the measured number of pixels is the predetermined number of pixels or more in Step SP43, in Step SP44, the image processor outputs valid information indicating valid data and beam relating information. On the other hand, in the case in which the measured number of pixels is less than the predetermined number of pixels in Step SP43, the image processor outputs invalid information indicating invalid data in Step SP45.

In the case in which invalid information is inputted from the image processor, in Step SP46, the controller CP determines that the burst signal is not on, does not control the mirror M, and waits for an input of a subsequent beam relating information. On the other hand, in the case in which valid information is inputted, in Step SP46, the controller CP determines that the burst signal is on. Similarly in Step SP03 of the comparative example, in Step SP47, the controller CP controls the mirror M based on the inputted beam relating information. Accordingly, feedback control is performed in such a manner that the position of the center of gravity of the $CO_2$ laser beam 301 transmitted through the beam splitter BS is at a predetermined target position.

6.3 Effect

Thus, in the embodiment, in the case in which the number of pixels having a predetermined luminance is less than the predetermined number of pixels, the image processor IP outputs the index indicating invalid data together with beam relating information. In the case in which index data is invalid data, the controller CP does not control the mirror M. As described above, in the case in which the number of pixels having a predetermined luminance is less than the predetermined number of pixels, the signal-noise (SN) ratio is prone to be low. When the SN ratio is low, it is highly difficult to adjust the mirror M to a position where the mirror M has to be originally located. Thus, in accordance with the $CO_2$ laser device 3 of the embodiment, inappropriate control of the mirror M can be suppressed, and the entrance of the $CO_2$ laser beam emitted from the master oscillator MO to the chamber of the EUV light generating apparatus from an incorrect position can be reduced.

Note that, in the embodiment, the image processor outputs the index indicating valid data together with beam relating information in the case in which the measured number of pixels is the predetermined number of pixels or more. The image processor outputs the index indicating invalid data together with beam relating information in the case in which the measured number of pixels is less than the predetermined number of pixels. However, the image processor may be configured to output beam relating information in the case in which the measured number of pixels is the predetermined number of pixels or more and configured to output only an index indicating invalid data with no output of beam relating information in the case in which the measured number of pixels is less than the predetermined number of pixels. In this case, the controller CP may be configured to control the mirror M in the case in which beam relating information is inputted based on the inputted beam relating information in Step SP47 and configured not to control the mirror M in the case in which index data is invalid data and to wait for an input of a subsequent beam relating information.

Preferably, the control of the $CO_2$ laser device 3 according to the embodiment is combined with the control of the $CO_2$ laser device 3 according to any one of the first to the third embodiments, from the viewpoint that can more appropriately reduce the entrance of the $CO_2$ laser beam emitted from the master oscillator MO to the chamber of the EUV light generating apparatus from an incorrect position.

So far, the present disclosure is described using the embodiments as examples. However, the present disclosure is not limited to the embodiments.

For example, in the foregoing embodiments, the $CO_2$ laser device is described as an example. However, the present disclosure is not limited to the $CO_2$ laser device, and is also applicable to other laser devices. In the foregoing embodiments, the $CO_2$ laser device is described as an example in which the $CO_2$ laser device is one part of the EUV light generating system. However, the present disclosure is not limited to this. The present disclosure is also usable as a laser device alone.

In the forgoing third embodiment, description is provided on the case in which the entire period in which the infrared line sensor IS acquires a cross sectional image is overlapped with the period in which the master oscillator MO emits the $CO_2$ laser beam 301. However, it is also possible to adopt a configuration in which the controller CP controls the mirror M based on the beam relating information in the case in which the period in which the infrared line sensor IS acquires a cross sectional image is partially overlapped with the period in which the master oscillator MO emits the $CO_2$ laser beam 301.

In the foregoing embodiments, since the $CO_2$ laser beam is used as a laser beam, the infrared line sensor is used as a line sensor. However, in the present disclosure, any line sensor other than the infrared line sensor can be used when the line sensor is an optical sensor that acquires the cross sectional image of a laser beam during a certain period. Any optical sensor other than the line sensor may be used. For example, the optical sensor may be an infrared area sensor configured of a microbolometer grid, for example.

The description above is merely examples, not limitation. Thus, it is apparent to a person skilled in the art that the embodiments of the present disclosure can be modified and altered without deviating from the scope of the appended claims.

The terms used throughout the specification and the appended claims have to be interpreted as "non-limiting" terms. For example, the term "to include" or "to be included" has to be interpreted to include non-limiting components. The term "to have" has to be interpreted to have non-limiting components. The indefinite articles "a" and "an" described in the specification and the appended claims have to be interpreted that the indefinite articles mean "at least one" or "one or more".

What is claimed is:

1. A laser device comprising:
a light source configured to emit a laser beam in burst operation;
an optical sensor configured to acquire a cross sectional image of the laser beam during a certain period for every certain cycle;
an image processor configured to receive an input of an image signal of the cross sectional image outputted from the optical sensor and output beam relating information about the laser beam;
a beam traveling direction adjuster configured to adjust a traveling direction of the laser beam; and
a controller configured to control the beam traveling direction adjuster based on the beam relating information when at least a part of a period in which the optical sensor acquires the cross sectional image is overlapped with a period in which the light source emits a laser beam, wherein:
a burst signal to operate the light source in burst operation and be outputted from an external device is input to the image processor; and
the image processor outputs, to the controller, invalid information indicating that the beam relating information is invalid when the burst signal is off.

2. The laser device according to claim 1, wherein:
the laser beam is a $CO_2$ laser beam; and
the optical sensor is an infrared line sensor.

3. The laser device according to claim 1, wherein:
the controller holds history information having a plurality of emission time periods in which the light source has emitted a laser beam in an earlier time;
the controller calculates an acquisition time period in which the optical sensor acquires the cross sectional image based on a time instant at which the beam relating information is inputted from the image processor; and
the controller controls the beam traveling direction adjuster based on the beam relating information when at least a part of the acquisition time period is overlapped with any one emission time period in the history information.

4. The laser device according to claim 3, wherein
the controller controls the beam traveling direction adjuster based on the beam relating information when the entire acquisition time period is overlapped with any one emission time period in the history information.

5. The laser device according to claim 1, wherein
the image processor outputs the beam relating information when an area to be the cross sectional image in an image acquired by the optical sensor is a predetermined area or more.

6. The laser device according to claim 5, wherein
the image processor outputs invalid information indicating that information to be outputted is invalid when an area to be the cross sectional image in an image acquired by the optical sensor is not a predetermined area or more.

7. A control method for a laser device,
the laser device including:
a light source configured to emit a laser beam in burst operation;
an optical sensor configured to acquire a cross sectional image of the laser beam during a certain period for every certain cycle;
an image processor configured to receive an input of an image signal of the cross sectional image outputted from the optical sensor and output beam relating information about the laser beam;
a beam traveling direction adjuster configured to adjust a traveling direction of the laser beam; and
a controller,
the method comprising controlling the beam traveling direction adjuster based on the beam relating information when at least a part of a period in which the optical sensor acquires the cross sectional image is overlapped with a period in which the light source emits a laser beam, wherein:
a burst signal to operate the light source in burst operation and be outputted from an external device is input to the image processor; and
the image processor outputs, to the controller, invalid information indicating that the beam relating information is invalid when the burst signal is off.

* * * * *